United States Patent
Akiyama et al.

(10) Patent No.: US 7,036,941 B2
(45) Date of Patent: May 2, 2006

(54) ILLUMINATION OPTICAL DEVICE AND PROJECTOR

(75) Inventors: Koichi Akiyama, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 10/753,488

(22) Filed: Jan. 9, 2004

(65) Prior Publication Data

US 2004/0227910 A1 Nov. 18, 2004

(30) Foreign Application Priority Data

Jan. 14, 2003 (JP) ........................................ 2003-005638

(51) Int. Cl.
*G03B 21/20* (2006.01)
*F21V 7/00* (2006.01)

(52) U.S. Cl. ........................................ 353/102; 362/347
(58) Field of Classification Search ................... 353/98, 353/99, 102; 362/296, 297, 341, 347; 349/61, 349/67
See application file for complete search history.

(56) References Cited

U.S. PATENT DOCUMENTS

| | | | | |
|---|---|---|---|---|
| 3,308,715 A | * | 3/1967 | Ashcraft | ........................ 353/98 |
| 5,192,962 A | * | 3/1993 | Nishida et al. | ................. 353/98 |
| 5,634,704 A | * | 6/1997 | Shikama et al. | ............ 353/102 |
| 6,260,974 B1 | * | 7/2001 | Koyama | ........................ 353/98 |
| 6,464,362 B1 | * | 10/2002 | Sugawara et al. | ............ 353/102 |
| 6,607,276 B1 | | 8/2003 | Akiyama | ...................... 353/102 |
| 6,637,892 B1 | * | 10/2003 | Okuyama et al. | ............ 353/102 |
| 2005/0024879 A1 | * | 2/2005 | Takezawa | ..................... 362/341 |

FOREIGN PATENT DOCUMENTS

| | | |
|---|---|---|
| EP | 1 139 014 A2 | 10/2001 |
| JP | 9-120067 | 5/1997 |
| JP | A-2000-292740 | 10/2000 |
| JP | A-2000-347293 | 12/2000 |

* cited by examiner

*Primary Examiner*—Christopher Mahoney
(74) *Attorney, Agent, or Firm*—Oliff & Berridge, PLC

(57) ABSTRACT

An illumination optical device is provided with a light source device and a uniform illumination optical system. To a light flux emission side of an expanded portion of the light source lamp of the light source device, which is opposite to a reflector of the illumination optical device, a reflection member is provided. An effective reflection plane diameter of an elliptical reflector of the light source device is 30 mm or more but 50 mm or less, Furthermore, assuming that a first focal distance of the elliptical reflector is f1, and a second focal distance thereof is f2, f1 becomes equal to or more than 5 mm, but equal to or less than 50 mm, and f2/f1 becomes in a range from 4 to 7 inclusive. With such a structure, it becomes possible to provide an illumination optical device and a projector with which a solution can be provided to achieve further system downsizing, reducing or preventing light use efficiency from lowering, keeping a light quantity at a predetermined level or more, and reducing or preventing a manufacturing cost increase.

17 Claims, 8 Drawing Sheets

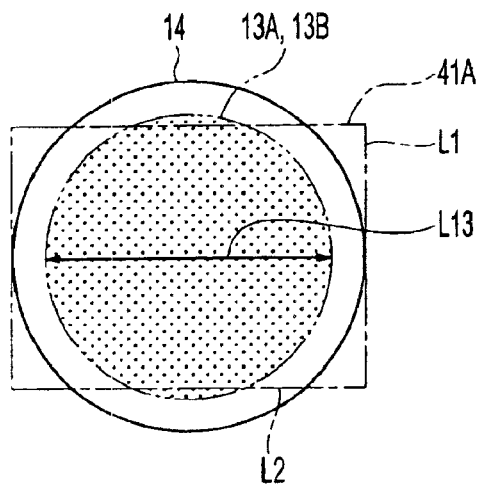 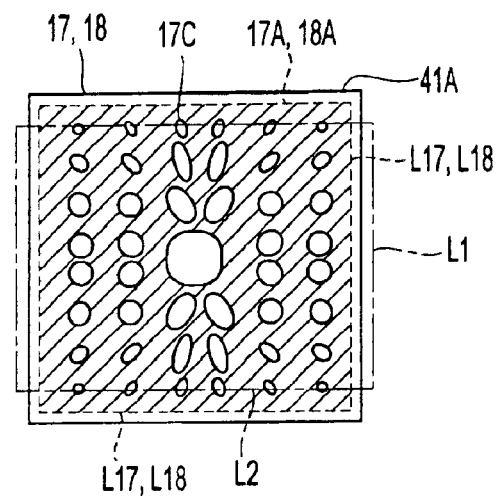
Fig. 4(A)  Fig. 4(B)
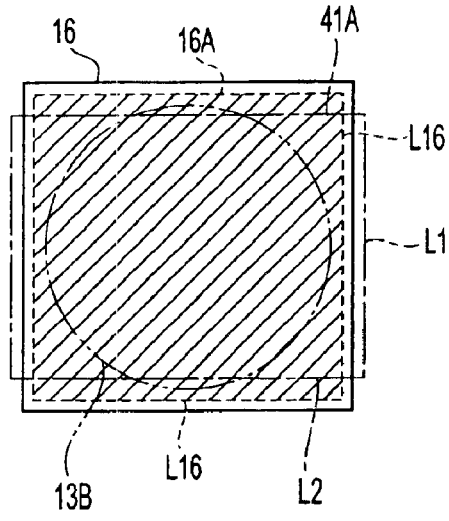 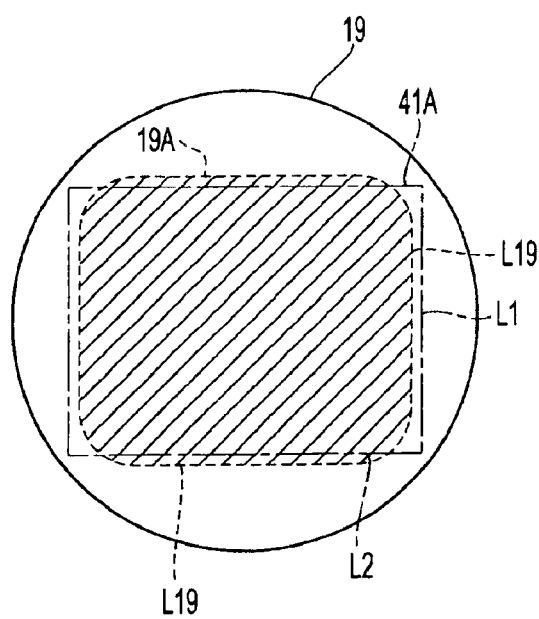
Fig. 4(C)  Fig. 4(D)

(A) f2/f1=4

(B) f2/f1=5

(A)

(B)

ILLUMINATION OPTICAL DEVICE AND PROJECTOR

BACKGROUND OF THE INVENTION

1. Field of Invention

The present invention relates to illumination optical devices and projectors.

2. Description of Related Art

In the related art a so-called three-plate projector of a type separates a light flux coming from a light source device into color light beams of three RGB colors using a dichroic mirror, performs modulation using three liquid crystal panels (light modulators) on a color light beam in accordance with image information, synthesizes the resulting light flux having been subjected to modulation using a cross dichroic prism, and enlarges and projects color images via a projection lens.

Such a projector is provided with an illumination optical device 100 as shown in FIG. 8. This illumination optical device 100 includes a light source device 110, and a uniform illumination optical system 150. The light source device 110 includes a light-emitting tube (light source lamp 12) as a radiation light source, an elliptical reflector 130, and a collimator concave lens 140. Radial light beams emitted from the light source lamp 12 are reflected and emitted by the elliptical reflector 130, and then collimated by the collimator concave lens 140.

The uniform illumination optical system 150 has a function of dividing the resulting light flux reflected by the elliptical reflector 130 into a plurality of partial light fluxes, and superposing the resulting light onto an image formation region of a liquid crystal panel 41. Included therein are: a light flux dividing optical element (first lens array 160); a polarization conversion element (PBS array 180); a second lens array 170; and a condenser 190 See for example, JP-A-2000-347293, pages 12 to 13, and FIG. 14.

With such an illumination optical device 100, for the purpose of capturing every light flux coming from the light source lamp 12, each of the first lens array 160, the second lens array 170, the PBS array 180, and the condenser 190 has an effective light flux passing region being square in outer shape. One side dimension thereof is almost equalized to the diameter dimension of the reflection plane at an opening portion of the reflector 130 (hereinafter, "effective reflection plane diameter"). Note here that the "effective light flux passing region" indicates a region in which, out of light fluxes passing through these optical components, any light flux allowed to pass through the image formation region of the light modulator (to-be-illuminated region) is observed. For example, in the vicinity of the second lens array 170, the PBS array 180, and the condenser 190, observed are images (arc images) as a result of converging a plurality of partial light fluxes that have been through division by the first lens array 160. The effective light flux passing region in this case is a virtual rectangular region to completely include such converged images.

SUMMARY OF THE INVENTION

The image formation region of the liquid crystal panel 41 is a rectangular structure including short sides and long sides, each being much shorter than the effective reflection plane diameter of the reflector 130. Thus, the incident angle of the light emitted from the outer edges of the condenser 190 to the liquid crystal panel 41 becomes large. Generally, the liquid crystal panel 41 is structured so that the light fluxes collimated by the reflector 130, a lens, or the like, go into the image formation region in an almost vertical direction. Accordingly, when the light fluxes go into the image formation region in a slanting direction, the resulting projection images may be easily degraded in contrast, resultantly possibly causing degradation of the image quality.

Moreover, in recent years, there has been a demand for downsizing of the illumination optical devices, and by extension, projectors. There is a problem that, if an elliptical reflector is adopted, the device may be increased in size depending on the reflector size, the light quantity of a predetermined level or more may be difficult to keep, and the manufacturing cost may be increased.

The present invention addresses enhancing the contrast, downsizing of the device, enhancing the light use efficiency, and preventing manufacturing cost increases.

The projector of an aspect of the present invention is directed to a projector provided with: a light modulator modulating an incoming light flux in accordance with image information, and including a rectangular image formation region to form an optical image; a light source device including a light-emitting tube, an elliptical reflector to reflect a light emitted from the light-emitting tube, and a collimator lens to collimate a light flux reflected by the elliptical reflector; a light flux dividing optical element in which a plurality of small lenses are structured in a matrix to divide the light flux emitted from the light source device into a plurality of partial light fluxes; and a condenser to superpose the partial light fluxes as a result of division by the light flux dividing optical elements on the image formation region. In an aspect of the present invention the collimator lens is placed at a position where the diameter of the light flux reflected by the elliptical reflector is equal to or longer than the short side dimension of the image formation region, but equal to or shorter than the long side dimension thereof. An effective light flux passing region of the light flux dividing optical element and the condenser are both set to be rectangular, where the side dimension is equal to or longer than the short side dimension of the image formation region, but equal to or shorter than the long side dimension thereof.

According to an aspect of the present invention, by using an elliptical reflector, the light beams coming from the light source lamp are not merely reflected but also reflected light fluxes are converged, so that the diameter thereof can be reduced. The collimator lens is placed at such a position that the diameter of the light flux reflected by the elliptical reflector is equal to or longer than the short side dimension of the image formation region but equal to or shorter than the long side dimension thereof. Thereby, as to the light flux dividing optical element and the effective light flux passing region of the condenser to be placed downstream of the collimator lens in terms of a light path, they are both set to be rectangular having side dimensions each being equal to or longer than the short side dimension of the image formation region, but equal to or shorter than the long side dimension thereof. With such a structure, the difference becomes extremely small between the side dimension of the effective light flux passing region of the condenser and the long and short side dimensions of the image formation region. This means that the incident angle of the light beams coming from the condenser is reduced with respect to the light modulator. The smaller the incident angle of the light beams is with respect to the light modulator, the better contrast the resulting projection image has. Thus, compared with a related art projector, the resulting contrast of projection images can be enhanced.

Moreover, due to the smaller incident angle of the light beams with respect to the light modulator as such, the emission angle of the light beams to be emitted from the light modulator also becomes smaller. Accordingly, the projection lens provided downstream of the light modulator in terms of light path can be increased by F number. The resulting projection images can be formed with higher resolution or with higher definition.

Furthermore, the light flux dividing optical element and the effective light flux passing region of the condenser are both set to be rectangular having side dimensions being equal to or longer than the short side dimension of the image formation region of the light modulator, but equal to or shorter than the long side dimension thereof. Thus, such sizes can be reduced to a greater degree than the related art ones. Accordingly, downsizing and weight reduction of the projector can be favorably achieved.

Herein, the expression of "the effective light flux passing region is set to be rectangular having side dimensions being equal to or longer than the short side dimension of the image formation region of the light modulator but equal to or shorter than the long side dimension thereof" does not mean that the light flux dividing optical element and the condenser are not set to be rectangular, having an outer shape being equal to or longer than the short side dimension of the image formation region of the light modulator, but equal to or shorter than the long side dimension thereof. The outer shape of the light flux dividing optical element and the condenser have to be such a size so to completely cover the effective light flux passing region. But not necessarily the same shape as the effective light flux passing region.

In an aspect of the present invention, the light-emitting tube may include a pair of electrodes arranged with a given space therebetween, and a tube-like member including the pair of electrodes, the given space between the electrodes of the tube-like member provided with an expanded portion, and a light flux emission side of the expanded portion, opposite to a reflector, is provided with a reflection member to reflect a reflection light beam to the elliptical reflector.

In the case of using a light-emitting tube having no reflection member, it is necessary to use an elliptical reflector having a large light flux reflection area (area of the effective reflection plane) to reflect the light coming from the light-emitting tube as much as possible. This is because the light irradiated but not reflected by the reflector cannot be effectively used. However if the reflection member is provided on the light flux emission side of the expanded portion of the light-emitting tube, opposite to the reflector, the light to be emitted from the light-emitting tube toward the opening portion of the elliptical reflector can be reflected onto the side of the elliptical reflector by the reflection member. Therefore, without using the elliptical reflector having a large light flux reflection area, it is possible to reduce or prevent any loss of light fluxes that one emitted from the light-emitting tube, and to enhance the light use efficiency.

In the case of using the elliptical reflector having a large light flux reflection area, the position where the diameter of the light flux reflected by the elliptical reflector is equal to or longer than the short side dimension of the image formation region, but equal to or shorter than the long side dimension thereof becomes distant from the light source lamp. Thus this requires a longer space between the light source lamp and the collimator lens. Furthermore, when the distance from the light source lamp is longer, it is necessary to increase the magnification of the collimator lens. Through provision of a reflection member to the light flux emission side portion of the expanded portion of the light-emitting tube, opposite to the reflector, the elliptical reflector can be reduced in size. If this is the case, the position where the diameter of the light flux, reflected by the elliptical reflector, is equal to or longer than the short side dimension of the image formation region, but equal to or shorter than the long side dimension thereof, comes closer to the light source lamp. Accordingly, this allows the collimator lens to be placed closer to the light source lamp, successfully downsizing the projector. Furthermore, because the collimator lens can be placed closer to the light source lamp, the magnification of the collimator lens can be decreased.

Furthermore, the reflection member may be a metallic film that is deposited onto the expanded portion. In such a case, the light emitted from the light-emitting tube can be directed to the elliptical reflector and reliably reflected. Accordingly, this reduces or prevents the light emitted from the light-emitting tube from being emitted without being reflected by the elliptical reflector, and leading to better light use efficiency.

Furthermore, in an aspect of the present invention, the collimator lens may be a collimator concave lens in which an incident side and/or an emission side of the effective light flux passing region is aspheric. In the case of using a collimator concave lens having a spherical surface, it causes a spherical aberration. As a result, the collimation level may be high in the center part. But the collimation level may not be enough for the outer peripheral regions. If the collimator concave lens is structured to have an aspheric surface on the incident side and/or the emission side, the collimation level can be enhanced for the light fluxes to be emitted.

This collimator concave lens may be any one of (1) a lens being hyperbolically aspheric on an incident side of the effective light flux passing region, and being flat on an emission side thereof, (2) a lens being flat on the incident side of the effective light flux passing region, and being elliptically aspheric on the emission side thereof, and (3) a lens being spherical on the incident side of the effective light flux passing region, and being hyperbolically aspheric on the emission side thereof. In the case of (1), the light flux is collimated on the incident side of the effective light flux passing region of the collimator concave lens, and on the emission side, it is not affected by refraction. Thus, derived are light fluxes with a higher collimation level at the time of emission. Furthermore, as the emission side is flat, the collimator concave lens can be manufactured at relatively low cost. In the case of (2), the diameter of the light flux to be emitted can be smaller. Furthermore, because the emission side of the effective light flux passing region is aspheric, the intensity of the light flux to be emitted does not vary substantially in the plane. In the case of (3), the same effects as (2) can be achieved, and additionally, as the incident side of the effective light flux passing region is spherical, no influence affected by light refraction is expected on the incident side. Thus, derived are light fluxes with higher collimation level at the time of emission.

Furthermore, in an aspect of the present invention, the above-described condenser may be flat on the incident side of the effective light flux passing region, and the emission side thereof is hyperbolically aspheric. With such a structure, as the emission side of the effective light flux passing region is aspheric, the aberration in the light fluxes to be emitted can be smaller. Thus, the light fluxes can be directed to the image formation region of the light modulator.

Furthermore, in another aspect of the present invention, between the light source device and the condenser, a polarization conversion element may be provided to align the polarization direction of the incoming light flux. The polarization conversion element is provided with:

a polarization separation film to separate the light emitted from the light source device into light having two types of polarization components; and a phase difference plate made of quartz or mica to align the polarization direction of any light having the two types of polarization components. According to an aspect of the present invention, as described in the foregoing, the light flux dividing element and the condenser can be considerably smaller in size than the related art. Through downsizing as such, the light flux density is increased, and the light quantity per unit area is also increased. The polarization conversion element is generally a phase difference plate made of resin. However, as the light quantity per unit area is increased, the resin will not be sufficient in terms of heat resistance. As a solution therefor, using a phase difference plate made of quartz or mica can enhance the heat resistance of the phase difference plate.

Another aspect of the invention is related to an illumination optical device provided with: a light source device including a light-emitting tube in which a pair of electrodes are included with a given distance therebetween, and in which a tube-like member with an expanded portion is provided at the given space between the pair of electrodes; a reflection member provided at a light flux emission side of the expanded portion, opposite to a reflector; an elliptical reflector to reflect a light emitted from the light-emitting tube; a collimator lens to collimate a light flux reflected by the elliptical reflector; a light flux dividing optical element to divide the light flux emitted from the light source device into a plurality of partial light fluxes; and a condenser to superpose the partial light fluxes as a result of division by the light flux dividing optical element on an image formation region of the light modulator, $4 \leq f2/f1 \leq 7$ being established when a first focal distance of the elliptical reflector is f1, and a second focal distance thereof is f2.

In an aspect of the invention, the light-emitting tube is placed so that the center of the light-emitting portion (arc center) almost coincides with the first focal point of the elliptical reflector. The collimator lens is placed at such a position that the light flux reflected by the elliptical reflector can be collimated, for example, if having a concave light flux incident plane, the lens is placed at a position where the second focal point of the elliptical reflector almost coincides with the focal point of the collimator lens.

Assuming that the ratio between the first focal distance f1 of the elliptical reflector and the second focal distance f2 thereof, i.e., f2/f1, is less than 4, the first focal distance f1, i.e., the distance from the elliptical reflector to the arc center of the light-emitting tube may be longer. If this is the case, an elliptical reflector having a large light flux reflection area (area of the effective reflection plane needs to be used). Thus, this results in a difficulty in device downsizing.

Alternatively, there may be a possibility of f2/f1 becomes less than 4 by reducing the distances of f1 and f2. If this is the case, however, the distance of f2 is reduced. Thus this may cause interference between the collimator lens and the light-emitting tube if a light-emitting tube for a general purpose is used. Thus, a special light-emitting tube needs to be prepared, which is small in size, resultantly increasing the manufacturing cost.

Furthermore, if f2/f1 exceeds 7, the second focal distance f2 becomes longer. As a result, the light path is increased from the elliptical reflector to the collimator lens. This results in a difficulty in downsizing the illumination optical device. This may result in lower light use efficiency due to large or distorted arc image (hereinafter, "deterioration of arc image"). Specifically, when the lens array and the PBS array are located in the downstream of the light flux dividing element in terms of light path, if the arc image is deteriorated, the arc image may not fit inside of the respective lenses in the lens array, or the arc image may not fit inside of the respective arrays of the PBS array. As a result, the light use efficiency may be lowered. This is because the arc image, failed in fitting inside of the lenses of the lens array or the arrays of the PBS array, cannot be effectively used as illumination light.

If f2/f1 is set so as to exceed 7 by reducing the value of f1, the distance between the elliptical reflector and the light-emitting tube becomes closer. Thus, the area of the elliptical reflector to reflect the light fluxes is reduced. As a result, the region of the collimator lens and others for a light flux passing region is narrowed down more than necessary, resulting in a problem that there may be a shortage of the light quantity.

In an aspect of the invention, f2/f1 is set so as to be 4 or more but 7 or less. Thus, no such a problem occurs, reduction of the light use efficiency is reduced or prevented, light quantity is kept at a predetermined level or more.

According to the above aspect of invention, a reflection member is provided to the light flux emission side of the expanded portion of the light-emitting tube locating opposite to the reflector. Thus, the reflection member allows reflection of the light, to be emitted from the light-emitting tube toward the opening side of the elliptical reflector, to the side of the elliptical reflector by the reflection member. In the case of using the light-emitting tube having no such reflection member, an elliptical reflector having a large light flux reflection area (area of the effective reflection plane) needs to be used to reflect the light fluxes coming from the light-emitting tube as much as possible. If the reflection member is provided on the light flux emission side of the expanded portion of the light-emitting tube, opposite to the reflector, the light to be emitted from the light-emitting tube toward the opening portion of the elliptical reflector can be reflected to the side of the elliptical reflector. Therefore, without using the elliptical reflector having a large light flux reflection area, it is possible to reduce or prevent any loss of light fluxes to be emitted from the light-emitting tube, and to enhance the light use efficiency.

In the above aspect of the invention, the to-be-illuminated region may be rectangular. The collimator lens is placed at a position where the diameter of the light flux reflected by the elliptical reflector is equal to or shorter than the short side dimension of the to-be-illuminated region, but equal to or longer than the long side dimension Thereof. An effective light flux passing region of the light flux dividing optical element and the condenser are both set to be rectangular, the side dimensions of which are each equal to or longer than the short side dimension of the to-be-illuminated region, but equal to or shorter than the long side dimension thereof.

According to the above aspect of the invention, by using an elliptical reflector, the light beams coming from the light source lamp are not merely reflected but also the reflected light fluxes are converged, so that the diameter thereof can be reduced. The collimator lens is placed at such a position that the diameter of the light flux reflected by the elliptical reflector becomes equal to or longer than the short side dimension of the to-be-illuminated region, but equal to or shorter than the long side dimension thereof. Thereby, as to the effective light flux passing region of the light flux dividing optical element and the condenser to be placed in the downstream of the collimator lens in terms of light path, they can both be set to be rectangular, having the side dimensions each being equal to or longer than the short side dimension of the to-be-illuminated region, but equal to or shorter than the long side dimension thereof. With such a structure, the difference becomes small between the side dimension of the effective light flux passing region of the condenser, and the long and short side dimensions of the to-be-illuminated region. This means that the incident angle of the light beams coming from the condenser can be reduced with respect to the to-be-illuminated region.

In the case where the illumination device of the above aspect of the invention is adopted to a projector including a light modulator, the smaller the incident angle of the light beams is with respect to the image formation region of the light modulator corresponding to the to-be-illuminated region, the better contrast the resulting projection image has. Thus, the resulting contrast of projection images can be enhanced. Due to the smaller incident angle of the light beams going into the light modulator as such, the emission angle of the light beams to be emitted from the light modulator also becomes smaller. And the projection lens provided in the downstream of the light modulator in terms of light path can be increased in F number, whereby the resulting projection images can be formed with the higher resolution or with the higher definition.

The effective light flux passing region of the light flux dividing optical element and the condenser are both set to be rectangular, the side dimensions of which are each equal to or longer than the short side dimension of the to-be-illuminated region, but equal to or shorter than the long side dimension thereof. Thus, such sizes can be reduced to a greater degree than in the related art. Accordingly, downsizing and weight reduction of the illumination optical device, by extension, downsizing and weight reduction of the projectors can be favorably achieved.

Herein, the expression of "the effective light flux passing region is set to be rectangular having the side dimension being equal to or longer than the short side dimension of the to-be-illuminated region, but equal to or shorter than the long side dimension thereof" does not mean that the light flux dividing optical element and the condenser are not set to be rectangular having the outer shape being equal to or longer than the short side dimension of the to-be-illuminated region, but equal to or shorter than the long side dimension thereof. The outer shape of the collimator lens, the light flux dividing optical element, and the condenser have to be in such a size as to completely cover the effective light flux passing region, but not necessarily in the same shape as the effective light flux passing region.

In the above aspect of the invention, the collimator lens may be a concave lens in which either a light flux incident plane or a light flux emission plane is aspheric. In the case of using a collimator concave lens having spherical sides, it causes a spherical aberration. As a result, the collimation level may be high in the center part, but the collimation level may not be enough for the outer regions. If the collimator concave lens is so structured as to have an aspheric surface on the incident side or the emission side, the collimation level can be enhanced for the light fluxes to be emitted.

In the above aspect of the invention, the first focal distance f1 of the elliptical reflector may be 5 mm or more. The diameter of the expanded portion of the light-emitting tube is about 9 mm (about 4.5 mm of radius) in general. Here, the light-emitting tube is placed so that the center (arc center) of the light-emitting section to be formed inside of the expanded portion almost coincides with the first focal point of the elliptical reflector. Thus, when the first focal distance f1 is 5 mm or less, the expanded portion may come into contact with the elliptical reflector. This is not considered desirable. However, setting the first focal distance to be 5 mm or more can keep the expanded portion from contacting with the elliptical reflector.

In an aspect of the present invention, the second focal distance f2 of the elliptical reflector may be 50 mm or more. The tube-like member of the light-emitting tube is generally about 20 to 35 mm in length from the center part of the expanded portion to the tip thereof. Therefore, when the second focal distance f2 is less than 50 mm, the tube-like member of the light-emitting tube may come into contact with the collimator lens. However, if the second focal distance f2 is set to be 50 mm or more, no such problem arises.

In the above aspect of invention, the effective reflection plane diameter of the elliptical reflector may be 30 mm or more, but 50 mm or less. If the effective reflection plane diameter exceeds 50 mm, such a reflector may be too large to downsize the illumination optical device. If the effective reflection plane diameter is less than 30 mm, the area to reflect the light fluxes may be too small. As a result, the region of the collimator lens and others for a light flux passing region is narrowed down, resulting in a concern of shortage of the light quantity. However, if the effective reflection plane diameter of the elliptical reflector is set so as to be 30 mm or more, but 50 mm or less, no such problem arises.

In the above aspect of invention, when a maximum angle θ, formed by a base end part of an emitted light flux along the illumination axis, and a light flux emitted from the light-emitting tube, may be 105 degrees or smaller. With such a structure, light emitted from the light-emitting tube does not emit in a wider range. Thus the effective reflection plane diameter of the elliptical reflector to reflect such light can be reduced in size.

BRIEF DESCRIPTION OF THE DRAWINGS

FIG. 4(A) is a schematic of the structure of a collimator lens 14, FIG. 4(B) is a schematic of the structures of a second lens array and a PBS array 18, FIG. 4(C) is a schematic of the structure of a first lens array 16, and FIG. 4(D) is a schematic of the structure of a condenser 19;

DETAILED DESCRIPTION OF EXEMPLARY EMBODIMENTS

Hereinafter, exemplary embodiments of the present invention is described by referring to the accompanying drawings.

Figure 1:
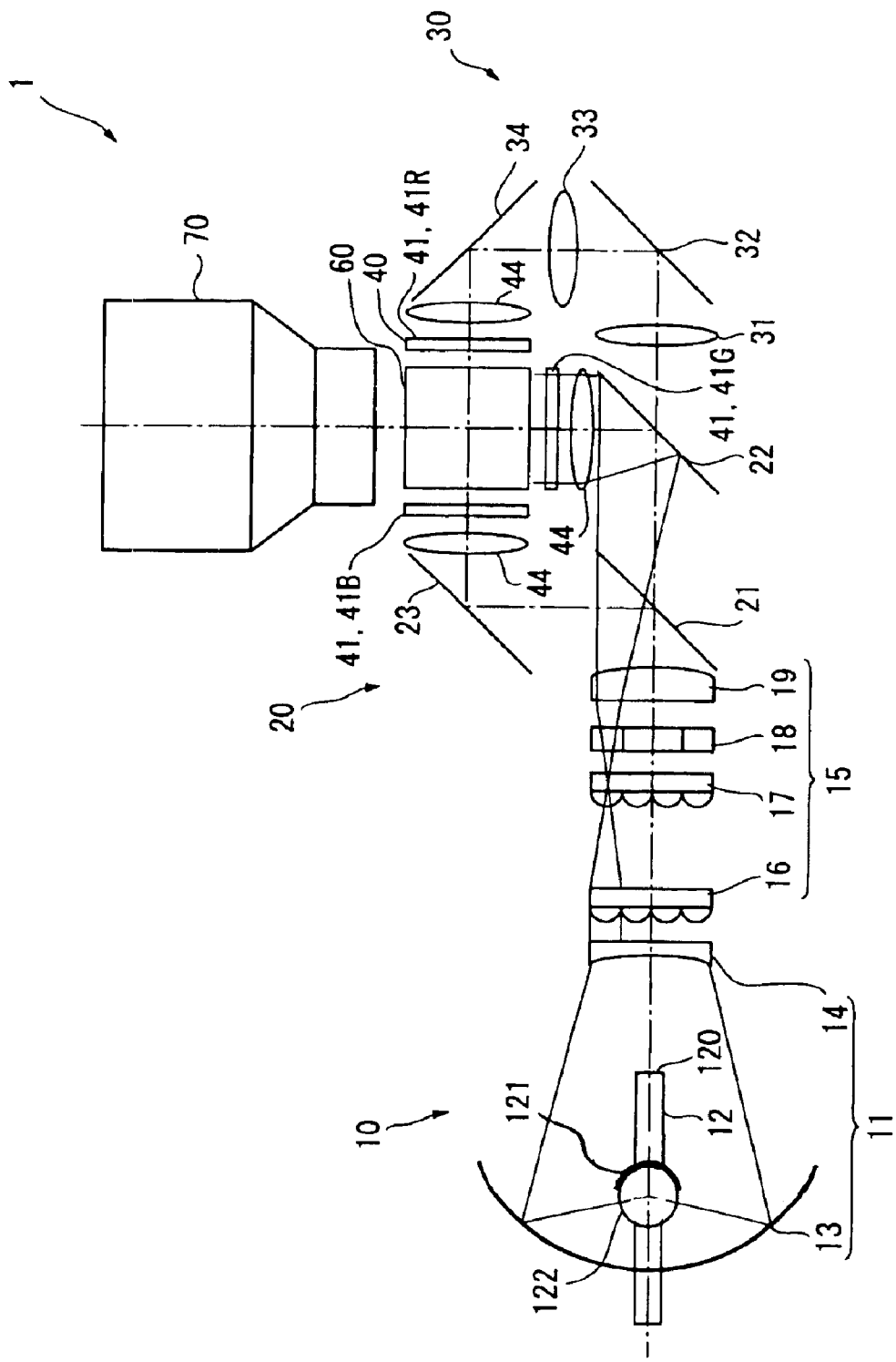
FIG. 1 is a schematic showing an optical system of a projector according to an exemplary embodiment of the present invention.

FIG. 1 is a schematic of an optical system of a projector 1 according to an exemplary embodiment of the present invention. The projector 1 is provided with an integrator illumination optical system (illumination optical device) 10, a color separation optical system 20, a relay optical system 30, an optical device 40, a cross dichroic prism 60 being a color synthesis optical system, and a projection lens 70 being a projection optical system.

The above-described illumination optical device 10 includes a light source device 11 and an uniform illumination optical system 15. The light source device 11 includes a light source lamp 12 (light-emitting tube), an elliptical reflector 13 to reflect light coming from the light source lamp 12, and a collimator concave lens 14.

The uniform illumination optical system 15 divides light fluxes coming from the light source device 11 into a plurality of partial light fluxes, and also aligns the polarization direction of each of the partial light fluxes into a P polarization light flux or an S polarization light flux. It is structured by including a first lens array 16 being a light flux dividing element, a second lens array 17 being a condenser, a PBS array 18 being a polarization conversion element, and a condenser 19 being a condenser.

Note that details of the illumination optical device 10 are left for later description.

The color separation optical system 20 includes two dichroic mirrors 21 and 22, and a reflection mirror 23. Therein, functionally, by the dichroic mirrors 21 and 22, a plurality of partial light fluxes coming from the illumination optical device 10 are separated into three color lights of red (R), green (G), and blue (B).

The relay optical system 30 includes an incident-side lens 31, a relay lens 33, and reflection mirrors 32 and 34, and has a function of guiding the red lights being color light beams as a result of separation by the color separation optical system 20 to a liquid crystal panel 41R.

At this time, out of the light fluxes emitted from the illumination optical device 10, the dichroic mirror 21 of the color separation optical system 20 transmits the red lights and the green lights, but reflects the blue lights. The blue lights thus reflected by the dichroic mirror 21 are reflected by the reflection mirror 23, pass through a field lens 44, and then reach a liquid crystal panel 41B for blue. With respect to the partial light fluxes emitted from the second lens array 17, the field lens 44 performs conversion into light fluxes parallel to their center axis (main beam). This is similarly applicable to the field lens 44, provided on the each light flux incident side of other liquid crystal panels 41G and 41R.

Further, out of the red lights and the green lights passing through the dichroic mirror 21, the green lights are reflected by the dichroic mirror 22, pass through the field lens 44, and then reach the liquid crystal panel 41G for green. After passing through the dichroic mirror 22, the red lights pass through the relay optical system 30 and then the field lens 44, and finally reach the liquid crystal panel 41R for red light beams.

Herein, the reason for using the relay optical system 30 specifically for the red lights is to reduce or prevent the light use efficiency from lowering due to light divergence or the like, because the light path of the red lights is longer than the light path of other color lights. Specifically, it is to transmit the partial light fluxes reaching the incident-side lens 31 to the field lens 44 as they are. Herein, the relay optical system 30 is so structured as to transmit red lights out of the three color lights. This is not limited, and it may be so structured as to transmit blue lights, for example.

The optical device 40 is the one to form color images by modulating the incoming light fluxes in accordance with image information, and provided with: three incident-side polarization plates (not shown) to receive the color lights as a result of separation by the color separation optical system 20; the field lens 44 to be arranged on the incident side of the incident-side polarization plates; the liquid crystal panels 41R, 41G, and 41B each as a light modulator to be arranged on the light flux emission side of each of the incident-side polarization plates; an emission-side polarization plate (not shown) to be arranged on the light flux emission side of each of the liquid crystal panels 41R, 41G, and 41B; and the cross dichroic prism 60 as a color synthesizing optical system.

The liquid crystal panels 41R, 41G, and 41B are the ones each derived by hermetically filling liquid crystal being the electro-optic material between a pair of glass transparent substrates. For example, a polysilicon TFT is used as a switching element, and in accordance with any given image signal, modulation is applied to the polarization direction of polarization light fluxes emitted from the incident-side polarization plate. The image formation regions of the liquid crystal panels 41R, 41G, and 41B are all rectangular. Out of the color lights as a result of separation by the color separation optical system 20, the incident-side polarization plate is an optical conversion element transmitting only polarization light beams directing in a given direction, and absorbing other remaining light fluxes. Out of the light fluxes emitted from the liquid crystal panels 41 (41R, 41G, 41B), the emission-side polarization plate is the one transmitting only the polarization light fluxes in a given direction, and absorbs other remaining light fluxes.

The field lens 44 is an optical element to collimate the emitted light fluxes, having been converged by the condenser 19 of the illumination optical device 10, with respect to the illumination optical axis.

The cross dichroic prism 60 is the one forming a color image by synthesizing optical images having been emitted from the emission-side polarization plate and modulated for each color light.

Figure 2:
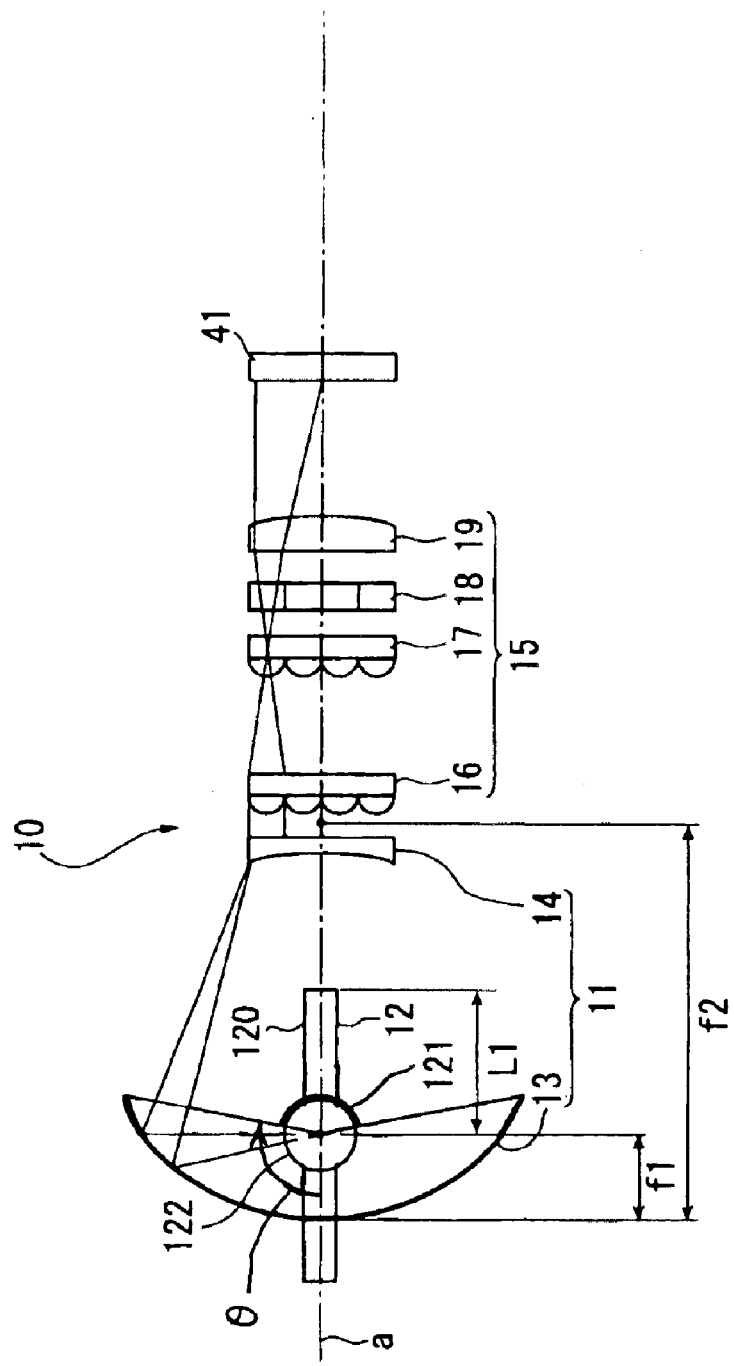
FIG. 2 is a schematic showing a relationship between an illumination optical device and a liquid crystal panel.

To the cross dichroic prism 60, a dielectric multi-layer film reflecting red lights and another dielectric multi-layer film reflecting blue lights are provided in a substantially X shape along the interface of four right-angle prisms. By these dielectric multi-layer films, three color lights are synthesized together. Referring also to FIG. 2, the illumination optical device 10 is described in detail. FIG. 2 is a schematic showing the relationship between the illumination optical device 10 and the liquid crystal panel 41.

As already described, the illumination optical device 10 is provided with the light source device 11 and the uniform illumination optical system 15. The light source device 11 includes the light source lamp 12, the elliptical reflector 13, and the collimator concave lens 14.

Although not shown, the light source lamp 12 has a pair of electrodes to be arranged with a given space therebetween, and a tube-like member 120 containing with these electrodes. The tube-like member 120 includes an expanded portion 122 expanding out from the space between the electrodes. The inside of this expanded portion is filled with gas, and with an application of voltage to a pair of electrodes, discharge occurs so that a light-emitting portion (arc) is formed. The length dimension L1 from the center of such a light-emitting portion (arc center) of the light source lamp 12 to the tip of the tube-like member 120 is about 20 to 35 mm (that is, the total length of the tube-like member 120 is about 40 to 70 mm), and the diameter of the expanded portion 122 is about 9 mm. Then, a reflection member 121 is provided to a light flux emission portion (i.e., on the side of the collimator concave lens 14), locating on the opposite side of the reflector 13 of the expanded portion 122. The luminous-intensity-distribution angle θ of the light source lamp 12 is 100 to 105 degrees, for example. Herein, this luminous-intensity-distribution angle θ is the maximum angle formed by a base end part of an emitted light flux along an illumination axis "a", and a light flux emitted from the light source lamp 12.

The reflection member 121 is the one provided to reflect light fluxes radiated from the side of the collimator concave lens 14 of the expanded portion 122 to the elliptical reflector 13. The reflection member 121 is the one derived by directly depositing a single-layer film of tantalum pentoxide or a multi-layer film of silicon dioxide onto the light flux emission plane locating on the opposite side of the reflector of the expanded portion. Alternatively, the reflection member 121 may be structured by attaching a second reflection mirror, having been deposited with such a multi-layer film, to a light-emitting tube.

Herein, such a light source lamp 12 is exemplified by a metalhalide lamp, a high-pressure mercury lamp, and others.

The elliptical reflector 13 is the one provided to reflect lights emitted from the light source lamp 12, and the effective reflection plane diameter is 30 mm or larger to 50 mm or smaller. Assuming here that a first focal distance of the elliptical reflector 13 is f1, and a second focal distance thereof is f2, f1 becomes 5 mm or more, and f2 becomes 50 mm or less. Further, f2/f1 becomes 4 or larger to 7 or smaller. In this exemplary embodiment, for example, f1=7.1 mm, f2=50 mm, f2/f1 is 7, and the effective reflection plane diameter of the elliptical reflector 13 is 30 mm.

Herein, the above-described light source lamp 12 is so arranged that the arc center almost positionally coincides with a first focal point of the elliptical reflector 13. The collimator concave lens 14 is the one provided to collimate the light fluxes reflected by the elliptical reflector 13. As to the collimator concave lens 14, the incident side of the effective light flux passing region has a hyperbolically aspheric surface, and an emission side thereof is flat. The collimator concave lens 14 is placed at such a position that the diameter of the light flux reflected by the elliptical reflector 13 is equal to or longer than the short side dimension of the image formation region of the liquid crystal panel 41, but is equal to or shorter than the long side dimension thereof, and also at such a position that the focal point the collimator concave lens 14 almost coincides with a second focal point of the elliptical reflector 13.

The uniform illumination optical system 15 is provided with the first lens array 16, the second lens array 17, the PBS array 18, and the condenser 19.

The first lens array 16 has a function as a light flux dividing optical element that divides a light flux emitted from the light source device 11 into a plurality of partial light fluxes. It is structured by including a plurality of lenses to be arranged in a matrix in a plane orthogonal to the illumination optical axis "a". The aspect ratio of each of the lenses corresponds to the aspect ratio of the image formation regions of the liquid crystal panels 41R, 41G, and 41B, all of which are included in the optical device 40, which will be described later.

The second lens array 17 is a condenser to converge the partial light fluxes as a result of division applied by the above-described first lens array 16, and similarly to the first lens array 16, including a plurality of lenses to be arranged in a matrix in a plane orthogonal to the illumination optical axis "a". The lenses are arranged in a corresponding manner to the lenses making up the first lens array. However, unlike the first lens array 16, their sizes do not necessarily correspond to the aspect ratio of the image formation regions of the liquid crystal panels 41R, 41G, and 41B.

The PBS array 18 as a polarization conversion element is an optical element to align the polarization direction of the partial light fluxes as a result of division applied by the first lens array 16 toward one specific direction. Although not shown, the PBS array 18 is structured by: a polarization separation film that transmits one of two polarization light fluxes varying in polarization direction, i.e., either P polarization light flux or S polarization light flux, and reflects the remaining polarization light flux to separate into those polarization light fluxes; a reflection mirror to direct one polarization light flux reflected by the polarization separation film by bending it in its traveling direction toward the emission direction of the other polarization light flux that has passed through; and a phase difference plate to align the polarization direction of those two polarization light fluxes. In consideration of the heat resistance, this phase difference plate may be made of quartz, mica, or resin.

By adopting such a PBS array 18, the light fluxes coming from the light source lamp 12 can be all aligned only to the polarization light fluxes having any one specific direction, thereby enhancing the use efficiency of the light beams coming from the light source.

The condenser 19 is a lens having a function of converging a plurality of partial light fluxes, having been passed through the first lens array 16, the second lens array 17, and the PBS array 18, to superpose those onto the image formation regions of the liquid crystal panels 41R, 41G, and 41B. The condenser 19 is flat on the incident side of the effective light flux passing region, and has a hyperbolically aspheric surface on the emission side.

Figure 3:
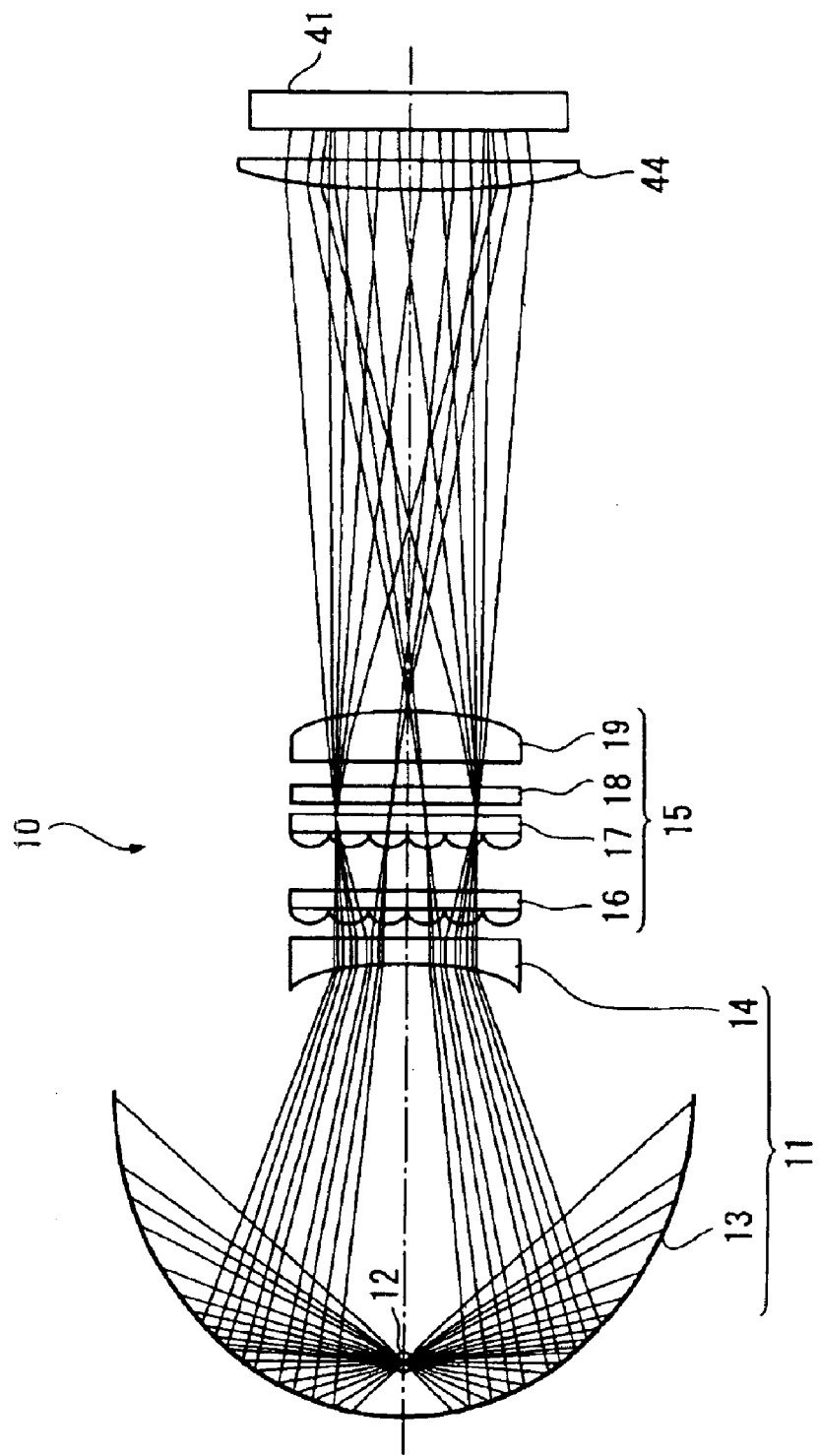
FIG. 3 is a schematic showing paths of light beams (f1=7.1 mm, and f2=50 mm) to be emitted from a light source device.

Next, by referring to FIG. 3 and FIGS. 4(A) to (D), a detailed structure of the illumination optical device 10 is described. FIG. 3 is a schematic showing the paths of light beams when f1=7.1 mm, and f2=50 mm (f2/f1=7). FIGS. 4(A) to 4(D) are all schematics of the structures of the collimator lens 14, the first lens array 16, the second lens array and the PBS array 18, and the condenser 19, respectively.

In the illumination optical device 10, when the light source lamp 12 is turned on, lights are responsively radiated. These lights are then reflected by the elliptical reflector 13. The elliptical reflector 13 is provided for not only reflecting lights coming from the light source lamp 12 but also to converge the thus reflected light fluxes, and thereby to reduce the diameter thereof. The lights thus reflected by the elliptical reflector 13 then go to the collimator concave lens 14 to be collimated.

As described in the foregoing, and as shown in FIG. 4(A), the collimator concave lens 14 is placed at such a position that a diameter L13 of a light flux 13A reflected by the elliptical reflector 13 becomes equal to or longer than a dimension L1 of the short side of an image formation region 41A of the liquid crystal panel 41, but equal to or shorter than a dimension L2 of the long side thereof. Accordingly, the diameter L13 of another light flux 13B coming from the collimator concave lens 14 becomes equal to or longer than the dimension L1 of the short side of the image formation region 41A of the liquid crystal panel 41, but equal to or shorter than the dimension L2 of the long side thereof.

The lights thus collimated by the collimator lens 14 sequentially pass through the first lens array 16, the second lens array 17, the PBS array 18, and the condenser 19. As shown in FIG. 4(C), a dimension L16 of the side of an effective light flux passing region 16A (diagonally shaded region in the drawing) of the first lens array 16 is equal to or longer than the dimension L1 of the short side of the image formation region 41A, but equal to or shorter than the dimension L2 of the long side thereof. As shown in FIG. 4(B), dimensions L17 and L18 of effective light flux passing regions 17A and 18A (diagonally shaded areas in the drawing) of the second lens array 17 and the PBS array 18 are both equal to or longer than the dimension L1 of the short side of the image formation region 41A, but equal to or shorter than the dimension L2 of the long side thereof. Moreover, as shown in FIG. 4(D), a dimension L19 of an effective light flux passing region 19A of the condenser 19 is also equal to or longer than the dimension L1 of the short side of the image formation region 41A, but equal to or shorter than the dimension L2 of the long side thereof. In FIG. 4(B), a plurality of arc images 17C are observed in the vicinity of the second lens array 17. The effective light flux passing region 17A is a virtual rectangular region to include all of these arc images. This is applicable also to the effective light flux passing regions 18A and 19A.

As is known from FIG. 4(D), a difference is extremely small between the side dimension L19 of the effective light flux passing region 19A of the condenser 19 and the long and short side dimension of the image formation region 41A. Furthermore, as shown in FIG. 3, the light beams emitted from the condenser 19 go into the image formation region of the liquid crystal panel 41 in almost a vertical direction. This means that the incident angle of the light beams is small with respect to the liquid crystal panel 41.

That is, according to an aspect of the present invention, it is known that the following effects can be achieved.

As the elliptical reflector 13 is used, the lights coming from the light source lamp 12 are not merely reflected but also the reflected light fluxes are converged, thereby being reduced in diameter.

The collimator concave lens 14 is placed at a position such that the diameter of the light fluxes reflected by the elliptical reflector 13 becomes equal to or longer than the short side dimension of the image formation region of the liquid crystal panel 41, but equal to or shorter than the long side dimension thereof. Then, as to the first lens array 16, the second lens array 17, the PBS array 18, and the condenser 19 to be placed in the downstream of the collimator lens in terms of light path, their effective light flux passing regions are all set so as to be rectangular having the side dimensions, each being equal to or longer than the short side dimension of the image formation region, but equal to or shorter than the long side dimension thereof. With such a structure, a difference becomes small between the side dimension of the effective light flux passing region of the condenser 19 and the long and short side dimension of the image formation region of the liquid crystal panel 41. Accordingly, the light beams emitted from the condenser 19 go into the image formation region of the liquid crystal panel 41 in almost the vertical direction. This means that the incident angle of the light beams can be smaller with respect to the light modulator. The smaller the incident angle of the light beams going into the liquid crystal panel 41, the better contrast the projection image havs. Thus, the resulting contrast of projection image can be enhanced.

Moreover, due to the smaller incident angle of the light beams going into the liquid crystal panel 41 as such, the emission angle of the light beams to be emitted from the liquid crystal panel 41 also becomes smaller. Accordingly, the projection lens 70 can be increased in F number, whereby the resulting projection images can be formed with the higher resolution or with the higher definition.

Furthermore, as to the first lens array 16, the second lens array 17, the PBS array 18, and the condenser 19, the side dimensions of their effective light flux passing regions are all equal to or longer than the short side dimension of the image formation region of the liquid crystal panel 41, but equal to or shorter than the long side dimension thereof. Thus, these optical components 16, 17, 18, and 19 can be all considerably reduced in size compared with the related art light flux dividing optical elements and others, each having the effective light flux passing region of almost the same dimension as the effective reflection plane diameter of the elliptical reflector 13. Accordingly, downsizing and weight reduction of the illumination optical device 10, by extension, the projector, can be achieved.

To the light flux emission portion locating on the opposite side of the reflector 13 of the expanded portion 122 of the light source lamp 12, the reflection member 121 is provided. In case of using the light source lamp 12 having no such reflection member 121, an elliptical reflector having a large light flux reflection area (area of the effective reflection plane) needs to be used to reflect the lights coming from the light source lamp 12 as much as possible. This is because the lights irradiated but not reflected by the reflector cannot be effectively used. In the present exemplary embodiment, the reflection member 121 is provided. Thus, the light beams to be emitted toward the opening portion of the elliptical reflector from the light source lamp 12 can be reflected onto the side of the elliptical reflector 13 by the reflection member 121. Therefore, without using the elliptical reflector having a large light flux reflection area, it becomes possible to reduce or prevent any loss of light beams to be emitted from the light source lamp 12, and to enhance the light use efficiency.

In case of using the elliptical reflector having a large light flux reflection area, the position, where the diameter of the light flux reflected by the elliptical reflector is equal to or longer than the short side dimension of the image formation region, but equal to or shorter than the long side dimension thereof becomes distant from the light source lamp 12. Therefore, it requires a longer space between the light source lamp 12 and the collimator lens 14. Furthermore, when the space from the light source lamp is sufficiently taken as such, magnification of the collimator lens needs to be increased. Through provision of the reflection member 121, the position, where the diameter of the light flux reflected by the elliptical reflector 13 is equal to or longer than the short side dimension of the image formation region, but equal to or shorter than the long side dimension thereof, comes closer to the light source lamp 12. Accordingly, this allows the collimator lens 14 to be placed closer to the light source lamp, and thus successfully downsizing the projector. Furthermore, because the collimator lens can be placed closer to the light source lamp, the magnification of the collimator lens can be decreased.

Generally, the light source lamp 12 is placed so that its arc center almost coincides with the first focal point of the elliptical reflector 13. The collimator concave lens 14 is placed at such a position that the light fluxes reflected by the elliptical reflector can be collimated, for example, if having a concave light flux incident plane, the lens is placed at a position where the second focal point of the elliptical reflector almost coincides with the focal point of the collimator lens.

Assuming that the ratio between the first focal distance f1 of the elliptical reflector 13 and the second focal distance f2 thereof, i.e., f2/f1, is less than 4, the first focal distance f1, i.e., the distance from the elliptical reflector 13 to the arc center of the light source lamp 12, may be longer. If this is the case, there needs to use the elliptical reflector having a large light flux reflection area (area of the effective reflection plane). Thus, this results in a difficulty in downsizing of the illumination optical device, by extension, the projector.

Alternatively, there may be a possibility of setting f2/f1 less than 4 by reducing the distances of f1 and f2. If this is the case, however, the distance of f2 is reduced. Thus this may cause interference between the collimator concave lens and the light source lamp if a light source lamp for a general purpose use is used. Thus, a special light source lamp needs to be prepared, which is small in size, resultantly increasing the manufacturing cost.

What is more, if f2/f1 exceeds 7, the second focal distance f2 becomes longer, and as a result, the light path is increased from the elliptical reflector 13 to the collimator concave lens 14. This results in a difficulty in downsizing the illumination optical device. What is worse, this may result in the lower light use efficiency due to deterioration occurring to the arc image. If f2/f1 is set so as to exceed 7 by reducing the value of f1, the distance between the elliptical reflector 13 and the arc center of the light-emitting tube 12 becomes closer. Thus, the area of the elliptical reflector 13 to reflect the light fluxes is reduced. As a result, the region of the collimator concave lens 14 and others for a light flux passing region is narrowed down more than necessary, resulting in a concern of shortage of the light quantity.

In the present exemplary embodiment, f2/f1 is set so as to be 4 or more but 7 or less. Thus, no such a problem occurs, and successfully a solution is provided to reduce or prevent increase of the manufacturing cost for the illumination optical device 10 and the projector 1, to achieve further downsizing, to reduce or prevent reduction of the light use efficiency, and to keep the light quantity at a predetermined level or more.

The incident side of the effective light flux passing region of the collimator concave lens 14 has a hyperbolically aspheric surface. Thus, the light fluxes are collimated on the incident side so as not to be affected by refraction on the emission side. Thus, light fluxes with higher collimation level at the time of emission are derived. Further, as the emission side is flat, the collimator concave lens 14 can be manufactured at relatively low cost.

Furthermore, as the emission side of the effective light flux passing region of the condenser 19 is aspheric, the aberration occurring in the to be emitted light fluxes can be smaller. Thus, the light fluxes can be directed to the image formation region of the liquid crystal panel 41. Moreover, because the incident side of the effective light flux passing region is flat, the condenser 19 can be manufactured easily.

In the present exemplary embodiment, as described in the foregoing, the effective light flux passing regions of the collimator concave lens 14, the first lens array 16, and others are reduced in size, leading to a higher light flux density. This requires an increase in the heat resistance of the phase difference plate of the PBS array. In this exemplary embodiment, if this phase difference plate is made of quartz or mica, compared with the phase difference plate made of resin, the heat resistance can be enhanced.

The diameter of the expanded portion 122 of the light source lamp 12 is about 9 mm (the radius of about 4.5 mm) in general. The light source lamp 12 is placed so that the arc center of the expanded portion 122 almost coincides with the first focal point of the elliptical reflector 13. Thus, when the first focal distance f1 is less than 5 mm, the expanded portion 122 may come into contact with the elliptical reflector 13, and is not considered desirable. In the present exemplary embodiment, the first focal distance is set to be 5 mm or more. Such a distance can keep the expanded portion 122 from contacting with the elliptical reflector 13.

As to the tube-like member 120 of the light source lamp 12, the length dimension L1 from the center part of the expanded portion 122 to the tip thereof is about 20 to 35 mm. Thus, if the second focal distance f2 is less than 50 mm, the tube-like member 120 of the light source lamp 12 may come into contact with the collimator concave lens 14. Contrary thereto, in the present exemplary embodiment, the second focal distance f2 is set to be 50 mm or more. Thus no such problem arises.

If the effective reflection plane diameter of the elliptical reflector exceeds 50 mm, such a large size results in difficulty in downsizing the illumination optical device. If the effective reflection plane diameter is less than 30 mm, the area to reflect the light fluxes becomes too small so that the effective light flux passing region of the collimator concave lens 14 and others are narrowed down too much. This may result in a shortage of light quantity. In the present exemplary embodiment, the effective reflection plane diameter of the elliptical reflector 13 is 30 mm or more but 50 mm or less. Accordingly, no such a problem arises.

Moreover, the luminous-intensity-distribution angle θ of the light source lamp 12 is 100 to 105 degrees. With such an angle, lights emitted from the light source lamp 12 do not emit in a wider range, and thus the elliptical reflector 13 to reflect such light beams can be reduced in diameter.

Note here that the present invention is not limited to the above-described exemplary embodiment. But variations, modifications, and others are included in the present invention.

For example, in the exemplary embodiment above, as to this collimator concave lens 14, the incident side of the effective light flux passing region has a hyperbolically aspheric surface, and an emission side thereof is flat. But a structure is not limited to these, and alternatively, the incident side may be flat and the emission side may have an elliptically aspheric surface, or the incident side may be spherical and the emission side may have a hyperbolically aspheric surface.

In the former case, the diameter of the light flux to be emitted can be smaller as the emission side is structured to be aspheric. Furthermore, because the emission side is aspheric, the intensity of the light flux to be emitted does not vary so much in the plane.

In the latter case, effects similar to the former case can be achieved, and furthermore, light beams are not affected by refraction on the incident side because the incident side is spherical. As such, light fluxes are derived with a higher collimation level at the time of emission.

Moreover, the collimator concave lens may be so structured as to have no aspheric surface but only a spherical surface. If this is the case, it may cause spherical aberration, and lower the collimation level. Even so, compared with the case of forming an aspheric surface, manufacturing spherical surface is advantageously simpler in process.

The collimator lens is not limited to be concave but may be convex. Exemplified for such a case is a collimation lens whose light flux incident surface is convex being aspheric, and the light flux emission plane is flat. In this case, such a collimator lens may be placed at a position where the diameter of the light flux reflected by the elliptical reflector is equal to or longer than the short side dimension of the image formation region of the liquid crystal panel, but equal to or shorter than the long side dimension thereof, and also at a position where the light beams converged at the second focal point of the elliptical reflector diverge.

In the above-described exemplary embodiment, the luminous-intensity-distribution angle θ of the light source lamp 12 is set to be 100 to 105 degrees. But the range is not limited these, and 90 degrees may be used, for example.

Furthermore, in the above exemplary embodiment, the first focal distance f1 of the elliptical reflector 13 is 5 mm or more. The second focal distance f2 thereof is 50 mm or more. But the distance is not limited to these. The first focal distance f1 may be less than 5 mm, and the second focal distance f2 may be less than 50 mm. In this case, the illumination optical device can be reduced in size to a greater degree. However, attention needs to be paid so that the elliptical reflector 13 does not interfere with the expanded portion 122 of the light source lamp 12, and the light source lamp 12 does not interfere with the collimator concave lens 14.

In the above exemplary embodiment, the first lens array 16, the second lens array 17, the PBS array 18, and the condenser 19 all have an effective light flux passing region being substantially square in shape. But the shape is not limited to these. The shape may be rectangular whose side length is equal to or longer than the short side dimension of the image formation region of the liquid crystal panel 41, but equal to or shorter than the long side dimension thereof. However, because the cross section of the light flux is circular, the square shape, as in the above exemplary embodiment, may have an advantage that the part, through which no light flux passes, is less in area in the effective light flux passing region.

Moreover, exemplified in the above exemplary embodiment is the projector 1 using the liquid crystal panel 41. But the projector is not limited to these, and a projector using a DLP (Digital Light Processor), and the like may be used. If this is the case, light fluxes are reflected by a very small mirror for projection, thereby suppressing light absorption loss that often occurs when the light fluxes pass through. Furthermore, it becomes possible to project clearer images.

To confirm effects of the present invention, the following experiment has been carried out.

First, with the second focal distance f2 of the elliptical reflector fixed to 50 mm, the effective reflection diameter of the elliptical reflector is measured by changing the first focal distance f1, and by changing f2/f1 in a range from 1 to 10 inclusive. The result is shown in the following Table 1.

TABLE 1

| f2/f1 | f1 (mm) | f2 (mm) | Effective Reflection Plane Diameter of Elliptical Reflector (mm) | Evaluation |
|---|---|---|---|---|
| 1 | 50 | 50 | — | X |
| 2 | 25 | 50 | — | X |
| 3 | 16.7 | 50 | 60 | X |
| 4 | 12.5 | 50 | 46 | ○ |
| 5 | 10 | 50 | 39 | ○ |
| 6 | 8.3 | 50 | 34 | ○ |
| 7 | 7.1 | 50 | 30 | ○ |
| 8 | 6.25 | 50 | 27 | X |
| 9 | 5.6 | 50 | — | X |
| 10 | 5 | 50 | — | X |

Figure 5:
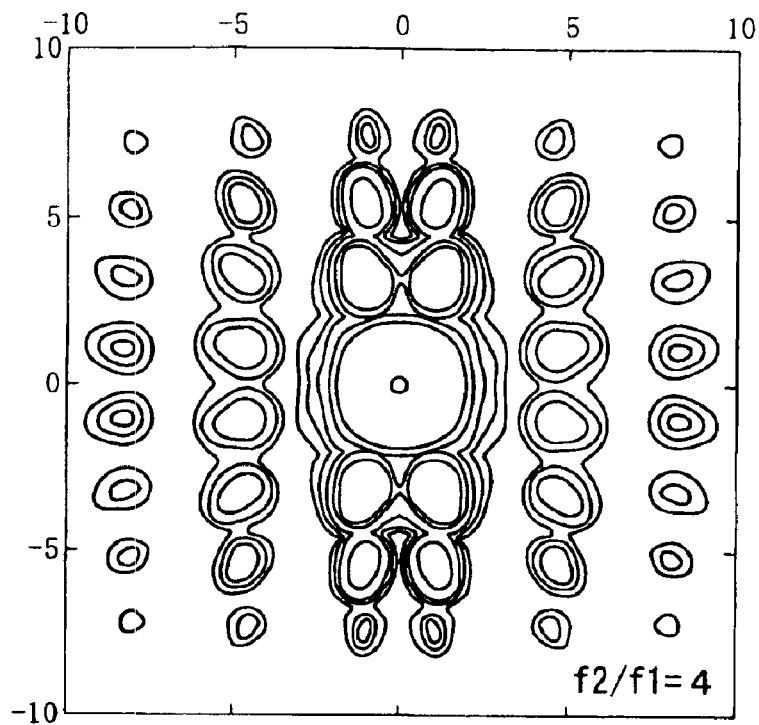
FIG. 5(A) is a schematic showing an arc image when f2/f1 is 4.
FIG. 5(B) is a schematic showing an arc image when f2/f1 is 5.
Figure 5:
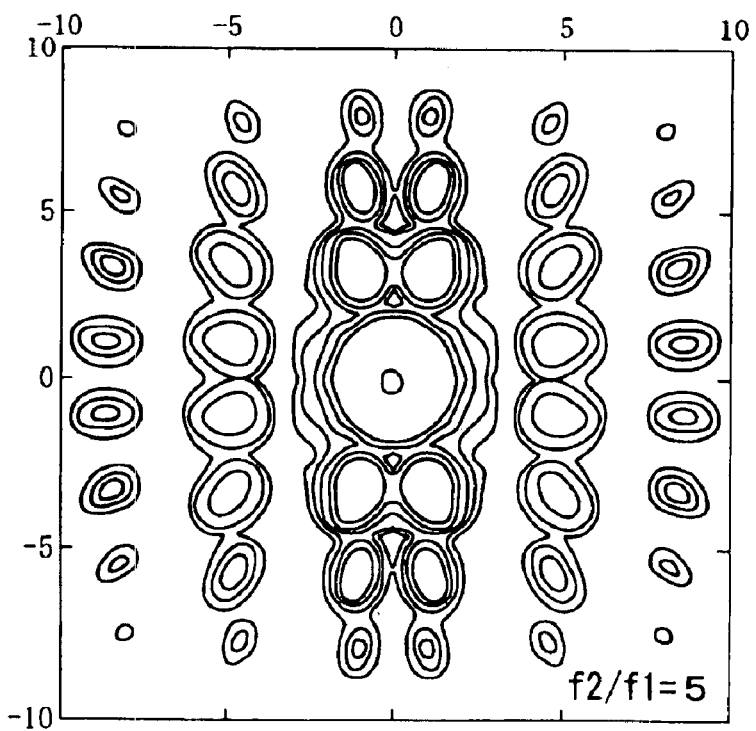
Figure 6:
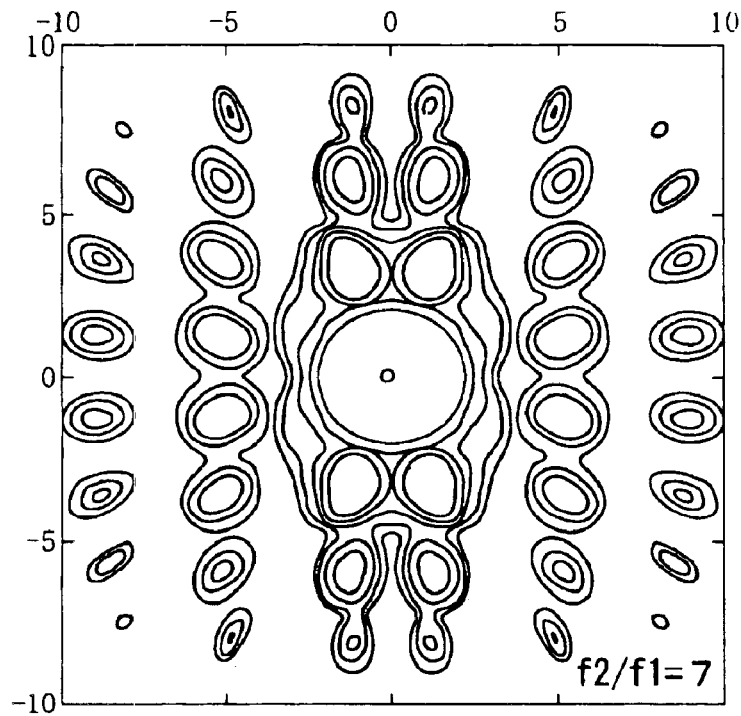
FIG. 6(A) is a schematic showing an arc image 2 when f2/f1 is 7.
FIG. 6(B) is a schematic showing an arc image when f2/f1 is 10.
Figure 6:
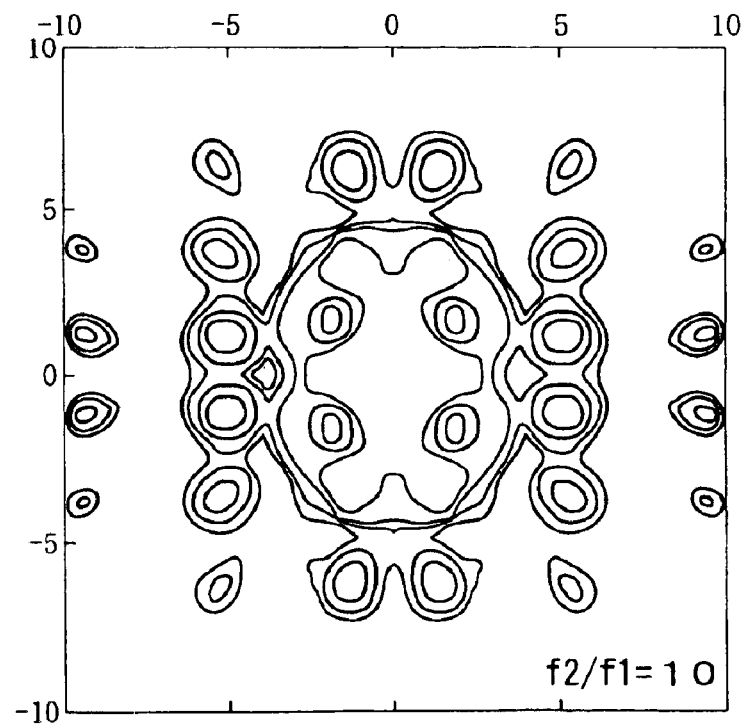

In Table 1, when f2/f1 is 4, 5, 7, or 10, FIGS. 5(A) and (B), and FIGS. 6(A) and (B) show the checking result of an arc image formed at the position in the vicinity of the polarization separation film of the PBS array 18. FIG. 5(A) is a schematic showing an arc image when f2/f1 is 4. FIG. 5(B) is a schematic showing an arc image when f2/f1 is 5. FIG. 6(A) is a schematic showing an arc image when f2/f1 is 7. FIG. 6(B) is a schematic showing an arc image when f2/f1 is 10.

As shown in Table 1, when f2/f1 is less than 4, the effective reflection plane diameter of the elliptical reflector becomes 60 mm or more. It is thus confirmed that therewith, the illumination optical device and the projector cannot be downsized. Moreover, when f2/f1 exceeds 7, the effective reflection plane diameter of the elliptical reflector becomes small, resulting in shortage of light quantity. Furthermore, as shown in FIG. 6(B), when f2/f1 is 10, deterioration is observed in the arc image. As a result, the PBS array cannot perform separation in an effective manner, and thus the light use efficiency is lowered.

When f2/f1 is in a range from 4 to 7 inclusive, the effective reflection plane diameter of the elliptical reflector is 30 mm or more but 50 mm or less. Thus, the light quantity can be sufficiently secured, and the illumination optical device and the projector can be reduced in size. As shown in FIGS. 5(A) and (B), and FIG. 6(A), no deterioration is observed to the arc image. Thus the PBS array can efficiently perform separation. Thus it is confirmed that the light use efficiency can be reduced or prevented from lowering.

Next, using the light source lamp 120 described in the foregoing, with the first focal distance f1 of the elliptical reflector fixed to 10 mm, the effective reflection plane diameter of the elliptical reflector is measured by changing the second focal distance f2, and by changing f2/f1 in a range from 1 to 10 inclusive. The result is shown in the following Table 2.

TABLE 2

| f2/f1 | f1 (mm) | f2 (mm) | Effective Reflection Plane Diameter of Elliptical Reflector (mm) | Evaluation |
|---|---|---|---|---|
| 1 | 10 | 10 | — | X |
| 2 | 10 | 20 | — | X |
| 3 | 10 | 30 | — | X |
| 4 | 10 | 40 | 38 | ○ |
| 5 | 10 | 50 | 39 | ○ |
| 6 | 10 | 60 | 41 | ○ |
| 7 | 10 | 70 | 42 | ○ |
| 8 | 10 | 80 | 43 | X |
| 9 | 10 | 90 | 44 | X |
| 10 | 10 | 100 | 43 | X |

Figure 7:
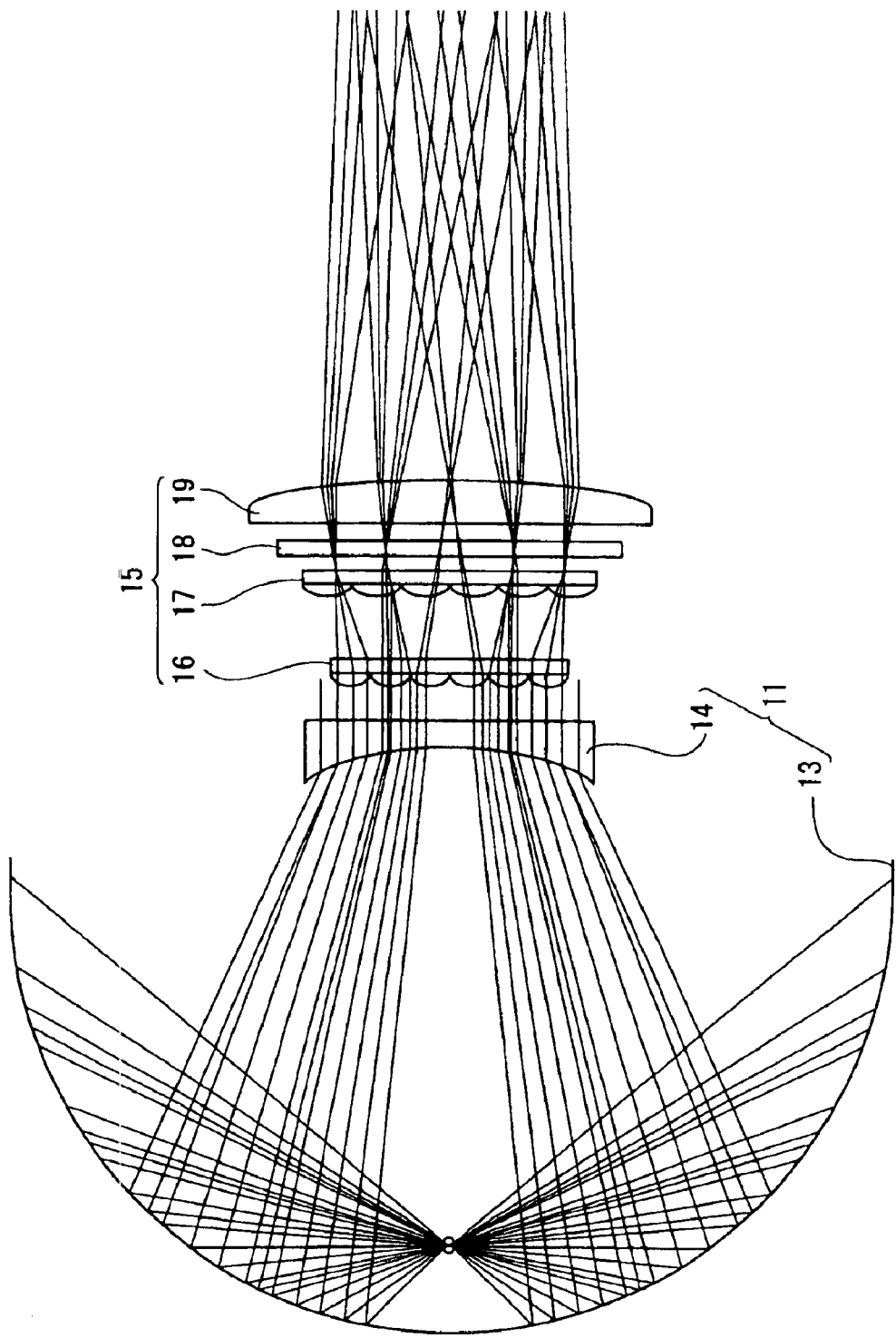
FIG. 7 is a schematic showing paths of light beams when f1=10 mm, and f2=100 mm.
Figure 8:
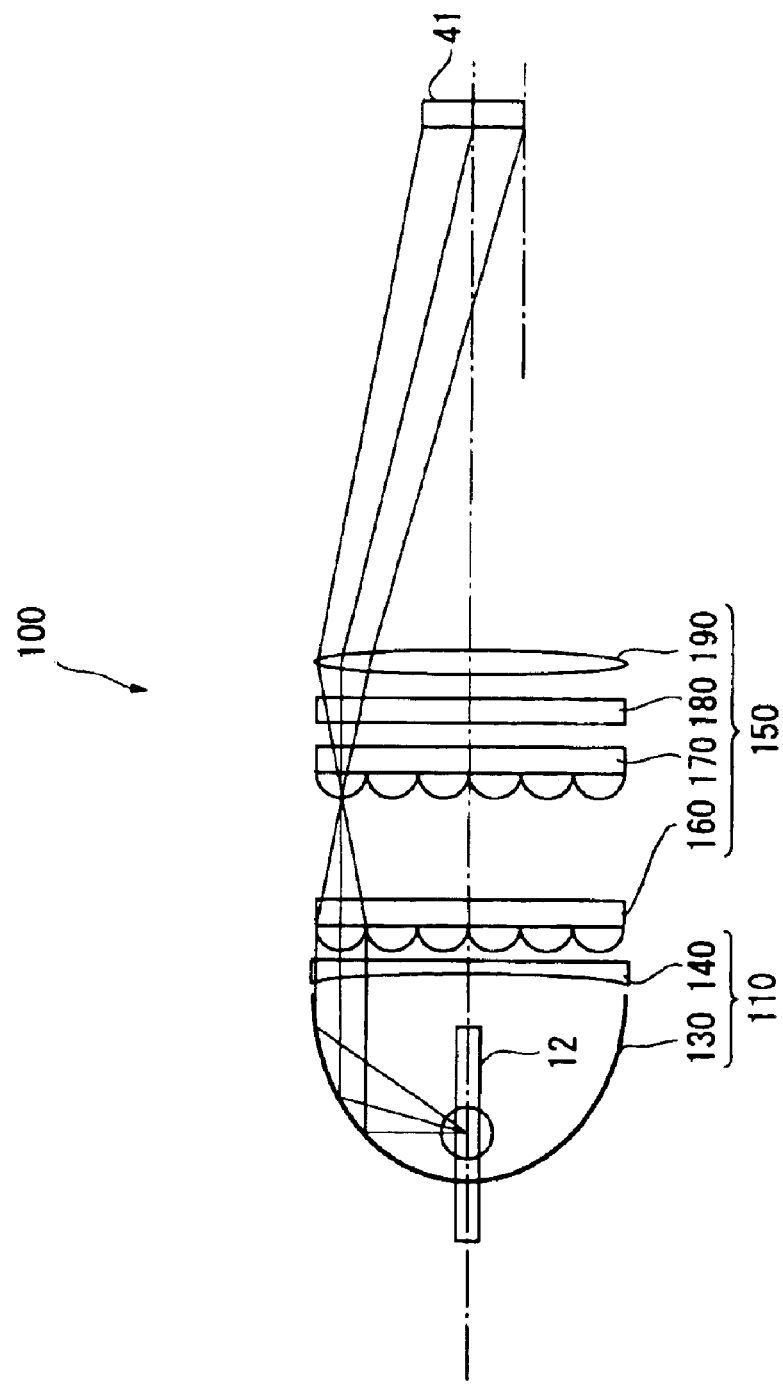
FIG. 8 is a schematic diagram showing a relationship between an illumination optical device and a liquid crystal panel in a related art device.

FIG. 7 shows the paths of light beams when f2/f1=10 in Table 2. As shown in Table 1, when f2/f1 is less than 4, the distance f2 becomes short, and there may be a possibility that the collimator lens and the light-emitting tube contact with each other. Thus, a special light source lamp, which is small in dimension has to be used.

When f2/f1 exceeds 7, as shown in FIG. 7, the paths of the light beams becomes longer, resulting in a difficulty in reducing the sizes of the illumination optical device and the projector. Although not shown, when f2/f1 exceeds 7, deterioration, as shown in FIG. 6(B), is observed to the arc image, causing the light use efficiency to be lowered.

When f2/f1 is 4 or more but 7 or less, no deterioration is observed to the arc image, the light paths are appropriate in length, and the effective reflection plane diameter of a predetermined size or more can be secured for the elliptical reflector. Thus, the illumination optical device and the projector can be reduced in size. The light use efficiency is not lowered, and the light quantity of a predetermined level or more can be secured. Moreover, when f2/f1 is 4 or more but 7 or less, the light source lamp of a general size similar to the exemplary embodiment can be used, thereby reducing or preventing the manufacturing cost from increasing.

What is claimed is:

1. A projector, comprising:
   a light modulator modulating an incoming light flux in accordance with image information, and including a rectangular image formation region to form an optical image;
   a light source device including a light-emitting tube, an elliptical reflector to reflect a light emitted from the light-emitting tube, and a collimator lens to collimate a light flux reflected by the elliptical reflector,
   a light flux dividing optical element in which a plurality of small lenses are structured in a matrix to divide the light flux emitted from the light source device into a plurality of partial light fluxes; and
   a condenser to superpose partial light fluxes formed as a result of division by the light flux dividing optical elements, on the image formation region of the light modulator,
   the collimator lens being placed at a position where a diameter of the light flux reflected by the elliptical reflector is equal to or longer than a short side dimension of the image formation region, but equal to or shorter than a long side dimension of the image formation region, and
   an effective light flux passing region of the light flux dividing optical element and the condenser being both set to be rectangular where their sides are equal to or longer than the short side of the image formation region, but equal to or shorter than the long side dimension of the image formation region.

2. The projector according to claim 1,
   the light-emitting tube including a pair of electrodes to be arranged with a given space therebetween, and a tube-like member containing the pair of electrodes,
   the given space between the electrodes of the tube-like member is provided with an expanded portion, and
   a light flux emission side of the expanded portion opposite to a reflector being provided with a reflection member to reflect a radiated light to the elliptical reflector.

3. The projector according to claim 2,
   the reflection member being a metallic film deposited onto the expanded portion.

4. The projector according to claim 1,
   the collimator lens being a collimator concave lens, in which an incident side and/or an emission side of the effective light flux passing region is aspheric.

5. The projector according to claim 4,
   the collimator concave lens being hyperbolically aspheric on the incident side of the effective light flux passing region, and the emission side of the effective light flux passing region being flat.

6. The projector according to claim 4,
   the collimator concave lens being flat on the incident side, and
   the emission side of the effective light flux passing region being elliptically aspheric.

7. The projector according to claim 4,
   the collimator concave lens being spherical on the incident side of the effective light flux passing region, and
   the emission side of the effective light flux passing region being hyperbolically aspheric.

8. The projector according to claim 1,
   the condenser being flat on the incident side of the effective light flux passing region, and
   the emission side of the effective light flux passing region being hyperbolically aspheric.

9. The projector according to claim 1,
   a polarization conversion element being provided to align a polarization direction of the incoming light flux between the light flux dividing optical element and the condenser, and
   the polarization conversion element having a phase difference plate made of quartz or mica.

10. An illumination optical device, comprising:
    a light source device including a light-emitting tube in which a pair of electrodes are included with a given distance therebetween, and in which a tube-like member with an expanded portion is provided at the given space between the pair of electrodes;
    a reflection member provided at a light flux emission side of the expanded portion, opposite to an elliptical reflector;
    the elliptical reflector reflecting a light emitted from the light-emitting tube;
    a collimator lens to collimate a light flux reflected by the elliptical reflector;
    a light flux dividing optical element to divide the light flux emitted from the light source device into a plurality of partial light fluxes; and
    a condenser to superpose the partial light fluxes as a result of division by the light flux dividing optical element on a to-be-illuminated region,
    $4 \leq f2/f1 \leq 7$ being established when a first focal distance of the elliptical reflector being f1, and a second focal distance thereof being f2.

11. The illumination optical device according to claim 10,
    the to-be-illuminated region being rectangular,
    the collimator lens being placed at a position where a diameter of the light flux reflected by the elliptical reflector is equal to or longer than a short side dimension of the to-be-illuminated region, but equal to or shorter than a long side dimension of the to-be-illuminated region, and
    an effective light flux passing region of the light flux dividing optical element and the condenser being both set to be rectangular where their side dimensions are equal to or longer than the short side of the to-be-illuminated region, but equal to or shorter than the long side dimension of the to-be-illuminated region.

12. The illumination optical device according to claim 10, the collimator lens being a concave lens in which either a light flux incident plane or a light flux emission plane is aspheric.

13. The illumination optical device according to claim 10, the first focal distance f1 of the elliptical reflector being 5 mm or more.

14. The illumination optical device according to claim 10, the second focal distance f2 of the elliptical reflector being 50 mm or more.

15. The illumination optical device according to claim 10, a diameter of an effective reflection plane, by which the elliptical reflector reflects a light flux, being 30 mm or more but 50 mm or less.

16. The illumination optical device according to claim 10, a maximum angle θ, formed by a base end part of an emitted light along the illumination axis, and a light flux emitted from the light-emitting tube, being 105 degrees or smaller.

17. A projector, comprising:

the illumination optical device in claim 10, and a light modulator modulating a light flux to be emitted from the illumination optical device in accordance with image information, the to-be-illuminated region being an image formation region of the light modulator.

* * * * *